United States Patent
Orozco et al.

(10) Patent No.: US 10,800,259 B2
(45) Date of Patent: Oct. 13, 2020

(54) PLUG-IN HYBRID VEHICLE WITH INTEGRATED CHARGER OPERATING ELECTRIC ENGINE TURBOCHARGER

(71) Applicant: Ford Global Technologies, LLC, Dearborn, MI (US)

(72) Inventors: Julio Orozco, Aachen (DE); Arnulf Sponheimer, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/977,791

(22) Filed: May 11, 2018

(65) Prior Publication Data
US 2018/0334042 A1    Nov. 22, 2018

(30) Foreign Application Priority Data

May 16, 2017 (DE) .......................... 10 2017 208 188

(51) Int. Cl.
| | |
|---|---|
| *B60L 1/00* | (2006.01) |
| *B60L 53/00* | (2019.01) |
| *B60L 50/16* | (2019.01) |
| *B60L 53/22* | (2019.01) |
| *B60L 50/61* | (2019.01) |
| *B60L 53/14* | (2019.01) |
| *B60L 53/56* | (2019.01) |

(52) U.S. Cl.
CPC .............. *B60L 1/003* (2013.01); *B60L 50/16* (2019.02); *B60L 50/61* (2019.02); *B60L 53/00* (2019.02); *B60L 53/14* (2019.02); *B60L 53/22* (2019.02); *B60L 53/56* (2019.02); *B60L 2260/22* (2013.01)

(58) Field of Classification Search
CPC ...... B60L 11/18; B60L 1/003; B60L 11/1816; B60K 6/46; B60K 6/44
See application file for complete search history.

(56) References Cited

U.S. PATENT DOCUMENTS

| | | |
|---|---|---|
| 4,920,475 A | 4/1990 | Rippel |
| 5,099,186 A | 3/1992 | Rippel et al. |
| 5,341,075 A | 8/1994 | Cocconi |
| 7,679,336 B2 * | 3/2010 | Gale ................... B60L 11/1816 |
| | | 180/65.1 |

(Continued)

FOREIGN PATENT DOCUMENTS

WO    2011159241 A1    12/2011

OTHER PUBLICATIONS

Saeid Haghbin, et. al., "Grid-Connected Integrated Battery Chargers in Vehicle Applications: Review and New Solution", IEEE Transactions on Industrial Electronics, vol. 60, No. 2, Feb. 2013, pp. 459-473.

*Primary Examiner* — Hau V Phan
(74) *Attorney, Agent, or Firm* — Brooks Kushman PC; David Kelley

(57) ABSTRACT

A plug-in hybrid vehicle includes an engine mechanically coupled to at least one wheel and having a turbocharger. A first electric machine is coupled to at least one wheel. A second electric machine is coupled to the turbocharger. An electric store or battery is coupled to the first and second electric machines. A controller is coupled to the second electric machine and a plug configured to connect to an external electric grid. The second electric machine is configured to drive the turbocharger during charging of the battery from the external electric grid via the plug.

17 Claims, 2 Drawing Sheets

(56) References Cited

U.S. PATENT DOCUMENTS

| | | | | |
|---|---|---|---|---|
| 7,681,676 | B2* | 3/2010 | Kydd | B60K 6/48 |
| | | | | 180/65.21 |
| 7,849,944 | B2* | 12/2010 | DeVault | B60K 6/365 |
| | | | | 180/65.29 |
| 9,873,342 | B2 | 1/2018 | De Sousa et al. | |
| 2001/0039230 | A1* | 11/2001 | Severinsky | B60H 1/004 |
| | | | | 477/3 |
| 2002/0003053 | A1* | 1/2002 | Geisse | B60K 6/44 |
| | | | | 180/65.225 |
| 2006/0250902 | A1* | 11/2006 | Bender | B60K 6/46 |
| | | | | 369/1 |
| 2015/0120108 | A1 | 4/2015 | Dudar et al. | |
| 2015/0360573 | A1* | 12/2015 | Cimatti | B60L 11/18 |
| | | | | 307/10.1 |
| 2016/0319742 | A1* | 11/2016 | Primus | F02C 3/10 |
| 2017/0082043 | A1* | 3/2017 | Dudar | F02D 41/0035 |

* cited by examiner

PLUG-IN HYBRID VEHICLE WITH INTEGRATED CHARGER OPERATING ELECTRIC ENGINE TURBOCHARGER

CROSS-REFERENCE TO RELATED APPLICATIONS

This application claims foreign priority benefits under 35 U.S.C. § 119(a)-(d) to DE Application 10 2017 208 188.0 filed May 16, 2017, which is hereby incorporated by reference in its entirety.

TECHNICAL FIELD

This disclosure relates to a plug-in hybrid vehicle having an integrated charger using an electric engine turbocharger to absorb torque during charging.

BACKGROUND

Plug-in hybrid vehicles are hybrid vehicles that can be driven in a manner known per se by an internal combustion engine, which operates, for example, according to the diesel-cycle, Otto-cycle or Miller-cycle process, and/or at least one electric machine (also referred to as a traction machine). To drive the hybrid vehicle, the electric machine is supplied in a motor operating mode with electrical energy from an electrical energy store, for example a chargeable high-power/high-voltage rechargeable battery (also referred to herein as high-power/high-voltage battery). In general, the electric machine can also be operated in a recuperation or generator operating mode in which said electric machine, for example in a braking process of the hybrid vehicle, converts at least some of the kinetic energy of said hybrid vehicle to electrical energy and feeds said electrical energy back to the electrical energy store to charge the electrical energy store. In addition, the electrical energy store in a plug-in hybrid vehicle can also be charged via a vehicle-external grid. To this end, the plug-in hybrid vehicle has a charging plug, which can be used to produce the electrical connection between the vehicle-external grid and the electrical energy store in the hybrid vehicle.

Furthermore, different ways of connecting the internal combustion engine and the at least one electric machine delivering drive power to the driven wheels of the hybrid vehicle are known, for example serial or parallel hybrid drive, wherein different designs of the drivetrain are indicated in a known manner in accordance with the position of the electric machine in the hybrid drivetrain. These different designs of the hybrid drivetrain are all well known and are therefore not explained in any more detail here.

For electrical control of the electric machine in motor operation and/or generator operation, said electric machine is generally electrically connected to the electrical energy store via an electronic control unit. The electronic control unit generally has an electronic high-power circuit, for example an inverter, which is designed, during the motor operating mode of the electric machine embodied, for example, as an AC machine, to convert a DC voltage provided by the electrical energy store to an AC voltage that can be used for driving the electric machine and, in a generator operating mode of the electric machine, to convert the AC voltage generated by the electric machine to a DC voltage, which can subsequently be fed to the electrical energy store to charge the electrical energy store. The exact design and the mode of operation of an electronic control unit of this kind are likewise well known and are therefore not explained in any more detail here.

To avoid equipping the plug-in hybrid vehicle with a separate additional electrical charging device for charging the electrical energy store via the external grid, it is furthermore known to use the electronic control unit for driving the electric machine, said electronic control unit already being present in the hybrid vehicle, to charge the electrical energy store from the external grid. The AC voltage of the external grid is provided to the plug-in hybrid vehicle on the AC voltage side of the control unit or the inverter, converted to DC voltage by the inverter, and subsequently supplied to the electrical energy store of the hybrid vehicle.

In the prior art, different solutions concerning this have been proposed, as are described by way of example in the documents WO 2011/159241 A1, U.S. Pat. Nos. 5,341,075, 4,920,475, 5,099,186 (also DE 691 13 970 T2) and WO 2010/057893 A1.

In a prior art charging process of the electrical energy store from the external grid, when supplying a three-phase alternating current from the vehicle-external grid to the AC voltage side of the inverter of a conventional plug-in hybrid vehicle, a torque at the rotor of the electric machine is generated in the electric machine (traction machine) that is likewise electrically connected to the AC voltage side of the inverter. In such a charging process, therefore, additional protective measures have to be taken to reliably prevent undesired movement of the hybrid vehicle. For example, the electric machine can be electrically isolated from the electronic control unit or the inverter during the charging process from the vehicle-external grid, for example by electrical switches provided accordingly in the hybrid vehicle, or the rotor of the electric machine can be prevented from rotating during the aforementioned charging operation by a specific locking apparatus. In each case, protective measures of this kind lead to a more complex design, a higher weight, and an increase in cost of the hybrid vehicle.

SUMMARY

Against this background, the claimed subject matter is directed to a hybrid vehicle having an integrated charger, in particular a plug-in hybrid vehicle, in which an electrical energy store in the hybrid vehicle can be charged using an electric traction machine from a vehicle-external grid electrically connected to the vehicle without the aforementioned measures with respect to the traction machine, wherein unintended movement of the hybrid vehicle during the charging process is prevented at all times. Furthermore, the hybrid vehicle is intended to make a simpler, more compact and more cost-effective design possible.

It should be noted that the features specified individually in the claims may be combined with one another in any desired technically meaningful manner and disclose further refinements or embodiments of the claimed subject matter. The description, in particular in conjunction with the figures, characterizes and specifies the claimed subject matter further.

In accordance with one or more embodiments of the disclosure, a plug-in hybrid vehicle has an internal combustion engine mechanically coupled to at least one driven wheel of the hybrid vehicle. The plug-in hybrid vehicle further has at least one exhaust-gas turbocharger, which can be driven by the exhaust gas of the internal combustion engine and is designed to increase the intake charge of the internal combustion engine during the internal-combustion-engine operation thereof. The turbocharger is also configured to operate electrically. Furthermore, the plug-in hybrid vehicle has at least one first electric machine, using which at least one driven wheel of the hybrid vehicle can be driven in a motor operating mode of the first electric machine (also referred to herein as a traction machine). The wheel of the hybrid vehicle that can be driven by the first electric machine may be the same wheel that can be driven by a mechanical coupling to the internal combustion engine. However, they may also be different wheels. The different possibilities for transmitting force both from the internal combustion engine and from the first electric machine to the driven wheel or wheels of the hybrid vehicle are well known and are therefore not explained in any more detail herein because the particular details are not essential for implementation of the claimed subject matter.

Moreover, the plug-in hybrid vehicle according to one or more embodiments of the disclosure has at least one electrical, chargeable energy store, which supplies electrical energy to the first electric machine in its motor operating mode. In this case, at least one first electronic control unit is connected between the first electric machine and the electrical energy store. The first electronic control unit serves for controlling and supplying electrical power to the first electric machine.

Moreover, the plug-in hybrid vehicle according embodiments of the disclosure has an electrical charging plug connector, which is electrically connected to at least one electrical energy store of the hybrid vehicle and can be electrically connected to a vehicle-external electrical grid during a charging operation, with the result that electrical energy can be supplied to the electrical energy store from the vehicle-external grid during the charging operation to charge the electrical energy store.

Furthermore, the plug-in hybrid vehicle according to one or more embodiments of the disclosure has a second electric machine, which can be coupled in torque-transmitting fashion to the exhaust-gas turbocharger to mechanically drive the exhaust-gas turbocharger in a motor operating mode of the second electric machine.

In accordance with the invention, the electrical energy store likewise supplies electrical energy to the second electric machine in its motor operating mode, wherein at least one second electronic control unit for controlling and supplying electrical power to the second electric machine is connected between the second electric machine and the electrical energy store.

In the plug-in hybrid vehicle according to one or more embodiments of the disclosure, the charging plug connector is further electrically connected to the second electronic control unit.

The plug-in hybrid vehicle according to one or more embodiments of the disclosure affords the significant advantage that the electrical energy store can be charged from the vehicle-external grid electrically connected to the hybrid vehicle without having to take additional precautions to prevent unintended vehicle movement at the electrical traction machine of the hybrid vehicle during the charging operation. Since the electrical energy supplied by the vehicle-external grid via the charging plug connector is provided at the second electronic control unit, which in turn is electrically connected to the second electric machine, although the electrical energy can bring about the generation of a torque at a rotor of the second electric machine, which torque in turn leads to the driving or rotation of the exhaust-gas turbocharger that is mechanically coupled to the second electric machine, the rotating exhaust-gas turbocharger has no negative effects on the internal combustion engine during said charging process and can therefore be tolerated. Unintended movement of the plug-in hybrid vehicle during the charging process from the vehicle-external grid is thus prevented at all times.

Since the electrically operable exhaust-gas turbocharger is provided in the plug-in hybrid vehicle anyway, for example to improve the exhaust-gas values of the internal combustion engine, in particular with respect to adhering to current and future $CO_2$ emission limit values, and to improve the performance of the internal combustion engine even in a low rotational speed range, no additional components are required to realize the proposed charging strategy for the plug-in hybrid vehicle according to one or more embodiments of the claimed subject matter. This makes a compact design possible and also reduces the production costs of the plug-in hybrid vehicle.

To control and supply electrical power to the first electric machine, the first electronic control unit can comprise an inverter (also referred to herein as first inverter), which is designed to convert the form of electrical energy provided by the electrical energy store to a form of electrical energy required by the first electric machine in its motor operating mode.

The first electronic control unit or the first inverter can likewise be designed to convert a form of electrical energy generated by the first electric machine in a generator or recuperation operating mode to the form of energy that can be used by the electrical energy store to charge the electrical energy store during a driving operation of the hybrid vehicle. The first electronic control unit can likewise be designed to control the first electric machine in its generator operating mode.

The form of energy provided by the electrical energy store or required for charging is usually electrical DC voltage energy, whereas the form of energy required or generated by the first electric machine in motor operation and in generator operation is usually electrical AC voltage energy. In other words, the first electronic control unit or the first inverter is designed to convert DC voltage to AC voltage (motor operation) and possibly also AC voltage to DC voltage (generator operation).

The first inverter may include a high-power circuit, which has high-power semiconductor components such as transistors as electrical switching elements. The specific design of an inverter of this kind is generally known and will therefore not be described in any more detail herein.

In at least one embodiment, an exhaust-gas turbocharger and second electric machine have a permanent mechanical coupling between the second electric machine and the exhaust-gas turbocharger to provide a compact, lightweight, and simple design. However, the mechanical coupling could also be produced by a switchable coupling if desired or required.

In accordance with one advantageous embodiment according to the disclosure, the charging plug connector is electrically connected to machine-side connections of the second electronic control unit that are electrically connected to the second electric machine.

A further advantageous embodiment includes a second electronic control unit having at least one inverter (in this case also referred to as second inverter to differentiate from the aforementioned first inverter of the first electronic control unit), which is designed to convert a form of electrical energy provided by the electrical energy store to a form of electrical energy required by the second electric machine in its motor operating mode.

The second electronic control unit and/or the second inverter can likewise be designed to convert a form of electrical energy generated by the second electric machine in a generator operating mode to the form of energy that can be used by the electrical energy store to likewise charge the electrical energy store. The second electric machine operated as a generator can, for example, slow down the exhaust-gas turbocharger when a specific engine intake charging pressure is reached, with the result that the use of a generally known blow-off valve or wastegate can be activated, for example, and the energy that is otherwise lost here can instead be recuperated by the second electric machine and can be fed back as electrical energy to the electrical energy store. The second electronic control unit can likewise be designed to control the second electric machine in its generator operating mode.

Another further advantageous embodiment provides for the second electronic control unit to have an inverter, which is designed to convert the form of electrical energy supplied by the charging plug connector to the form of electrical energy required by the electrical energy store.

The second electronic control unit may be fitted with an inverter (second inverter) designed to convert the form of electrical energy provided by the electrical energy store to the form of electrical energy required by the second electric machine in its motor operating mode. Similarly, the second inverter may convert the form of electrical energy fed in via the charging plug connector to the form of electrical energy required by the electrical energy store and also to convert the form of electrical energy generated by the second electric machine in its generator operating mode to the form of energy that can be used by the electrical energy store. In other words, the second inverter may be formed by a single structural unit.

The second inverter may comprise a high-power circuit that includes high-power semiconductor components, such as transistors, as electrical switching elements. The specific design of an inverter of this kind is generally known and will therefore not be described in any more detail herein.

In principle, the second electronic control unit can be designed in a similar manner to the first electronic control unit, with the second electronic control unit adjusted to the rated power of the second electric machine, which may differ from the rated power of the first electric machine.

In accordance with a further advantageous embodiment according to the disclosure, the electrical energy store is a high-voltage store, such as a high-voltage battery, with a rated voltage of at least 320 V. The use of such a high voltage for supplying electrical power to the first and/or second electric machine leads to a higher efficiency and to a greater electrical power density (a lower physical volume) of the electric machines used and their associated electronic control units. This benefits, in particular, the electrically operable turbocharger unit, which contains the exhaust-gas turbocharger, the second electric machine that mechanically drives the exhaust-gas turbocharger, and the second electronic control unit that serves to control and supply electrical power to the second electric machine.

Furthermore, sizing the second electric machine and the second electronic control unit to the high voltage provided by the electrical energy store makes it possible to charge the electrical energy store in accordance with the generally known Level 1 and Level 2 standards or even in accordance with the Level 3 standard depending on the long-term efficiency of the second electronic control unit or the second inverter electronics.

In accordance with a further advantageous embodiment according to the disclosure, the second electric machine is a three-phase AC machine in which each phase is driven separately by the second electronic control unit. In other words, the second electronic control unit is in this case designed to convert a DC voltage provided by the electrical energy store to a three-phase AC voltage required for the second electric machine and a machine-side three-phase AC voltage to the DC voltage that can be used by the electrical energy store.

The second electric machine may be, for example, a permanent-magnet synchronous machine, a three-phase asynchronous machine, or a connected reluctance machine, which represent particular embodiments of the second electric machine.

Another further advantageous embodiment according to the disclosure provides for the charging plug connector to be a three-phase charging plug connector, which is designed for electrical connection to a vehicle-external three-phase AC grid. In combination with the second electronic control unit, which is set up to drive and supply electrical power to a second electric machine designed as a three-phase AC machine, the electrical energy store can be charged directly in a three-phase manner and achieve higher charging powers.

In accordance with a further advantageous embodiment according to the disclosure, a hybrid vehicle has an exhaust-gas recirculation device that contains a controllable exhaust-gas recirculation valve to control the recirculation of the exhaust gas generated by the internal combustion engine from an outlet side of the internal combustion engine to an inlet side of the internal combustion engine in a known manner. The exhaust-gas turbocharger is conventionally likewise connected in a fluid-conducting manner to the internal combustion engine both on the outlet side by a turbine and on the inlet side by a compressor. When, during the charging process of the electrical energy store via a three-phase vehicle-external AC grid connected to the charging plug connector in the second electric machine, a torque is generated as a result of the three-phase alternating current supplied to the machine side and consequently the exhaust-gas turbocharger is set in rotation, the exhaust-gas recirculation valve of the exhaust-gas recirculation device can advantageously be opened, with the result that the charging air pressure generated by the exhaust-gas turbocharger at relatively high rotational speeds at the inlet side of the internal combustion engine can escape unhindered through the exhaust-gas recirculation device by opening the exhaust-gas recirculation valve so that air accumulation between the compressor of the exhaust-gas turbocharger and the inlet side of the internal combustion engine is thus prevented.

Another further advantageous embodiment according to the disclosure includes an exhaust-gas turbocharger with the second electric machine mechanically coupled thereto to drive the exhaust-gas turbocharger. The second electronic control unit controlling and supplying electrical energy to the second electric machine forms an electrical turbocharger unit, wherein the plug-in hybrid vehicle has at least two said turbocharger units. The respective second electronic control units can be electrically connected to one another and are electrically connected to one another during the charging operation. As a result, the possible charging power of the plug-in hybrid vehicle can be increased even further. If required, the second electronic control units can be connected to one another in an electrical parallel circuit, for example by means of corresponding electrical switching apparatus.

Further features and advantages of the claimed subject matter will be apparent from the following description of representative embodiments, which are not to be understood as being restrictive and which will be explained in greater detail in the following text, with reference being made to the figures.

DETAILED DESCRIPTION

Figure 1:
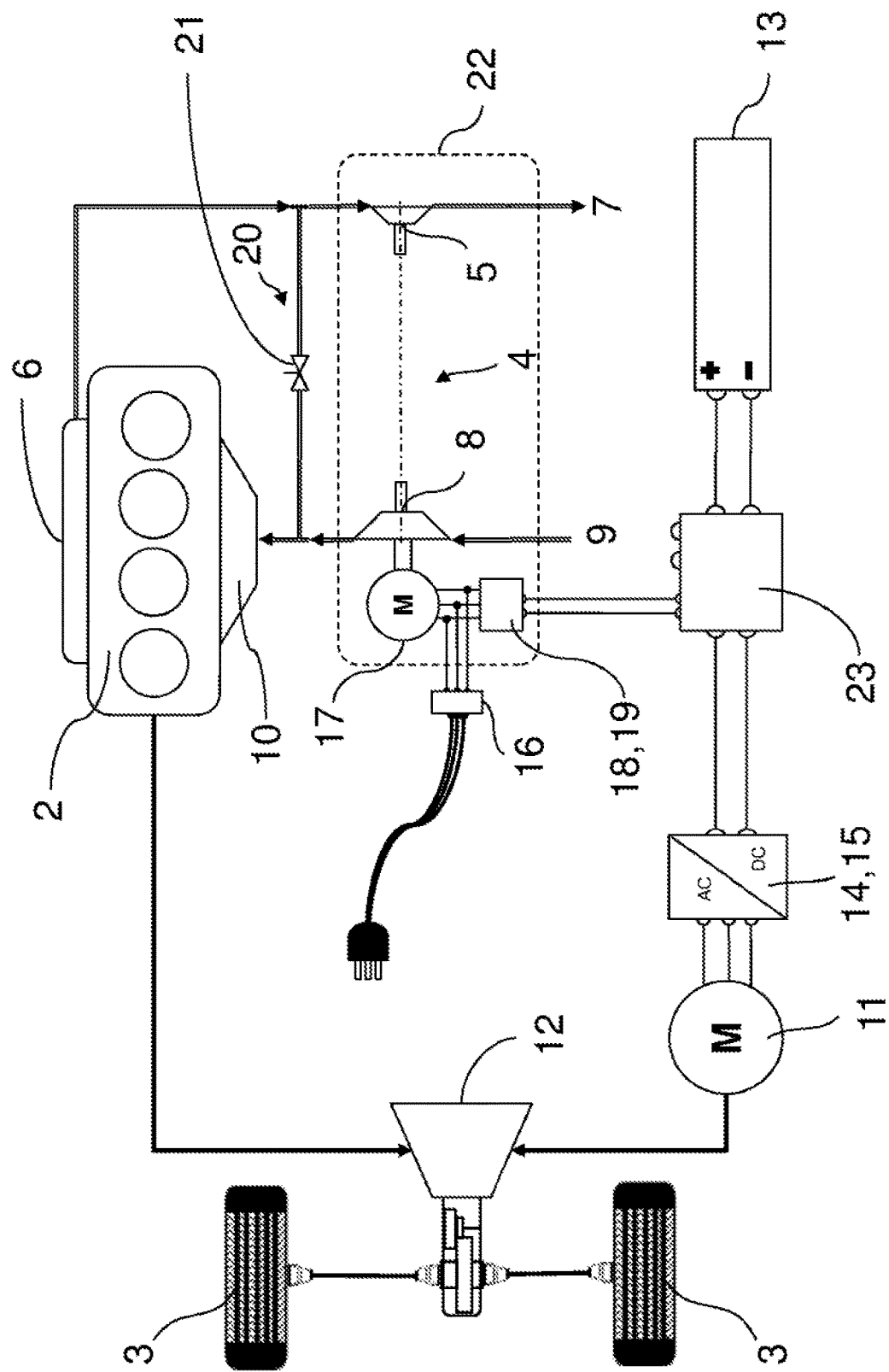
FIG. 1 schematically shows a representative embodiment of a plug-in hybrid vehicle according to the disclosure.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In the different figures, parts of similar or equivalent function are provided with the same reference numerals and are generally also described only once.

FIG. 1 shows a schematic illustration of a representative embodiment of a two-track plug-in hybrid vehicle 1 according to the disclosure. The hybrid vehicle 1 has an internal combustion engine 2, which can operate, for example, according to the diesel-cycle, Otto-cycle or Miller-cycle process. In the representative embodiment of the hybrid vehicle 1 illustrated, two driven wheels 3 of the hybrid vehicle 1 are mechanically coupled to, and can be driven by internal combustion engine 2. The number of driven wheels 3 is not restricted to the representative embodiment of the hybrid vehicle 1 shown in FIG. 1. The internal combustion engine 2 can also drive fewer than two wheels 3 or more than two wheels 3.

The internal combustion engine 2 can also have an intake charged by a compressor of an exhaust-gas turbocharger 4 that includes a turbine driven by the exhaust gas of the internal combustion engine 2, as can be seen in FIG. 1. To this end, the exhaust-gas turbocharger 4 has a turbine 5 in a manner known per se, which is arranged in an exhaust-gas flow generated by the internal combustion engine 2. To this end, the exhaust gas generated by the internal combustion engine 2 is led from an outlet or exhaust manifold 6 of the internal combustion engine 2 to the turbine 5 of the turbocharger 4 and subsequently further to an exhaust pipe 7 (not illustrated in any more detail) of the hybrid vehicle 1.

The turbine 5 is connected for rotation with a compressor 8 of the exhaust-gas turbocharger 4 in a known manner by a connecting shaft, with the result that a rotation of the turbine 5 caused by the exhaust-gas flow likewise causes a rotation of the compressor 8. Compressor 8 consequently takes in intake air from an intake 9 (not illustrated in any more detail) and directs it in a compressed form to an inlet manifold 10 of the internal combustion engine 2. The mode of operation of an exhaust-gas turbocharger 4 of this kind is well known and is therefore not explained in any more detail herein.

The hybrid vehicle 1 illustrated in FIG. 1 further has a first electric machine 11, using which the two driven wheels 3 of the hybrid vehicle 1 can be driven electromotively in a motor operating mode of the first electric machine 11. The first electric machine 11 can therefore also be referred to as a traction machine 11. In the hybrid vehicle 1 illustrated, both the first electric machine 11 and the internal combustion engine 2 drive the same wheels 3. However, this is not necessarily required. The wheels of the hybrid vehicle 1 driven by the internal combustion engine 2 can differ from the wheels of the hybrid vehicle 1 driven by the first electric machine 11. A transmission 12 is provided for superposition of the drive forces of the internal combustion engine 2 and the first electric machine 11 and for delivery of said forces to the driven wheels 3, said transmission being able to function as a conventional power splitter, for example, or being able to represent a P1 or P2 drivetrain arrangement of the hybrid vehicle 1 that is known per se.

Furthermore, the hybrid vehicle 1 illustrated in FIG. 1 has an electrical, chargeable energy store 13, which in this case is embodied as a high-voltage battery with a rated voltage of greater than or equal to 320 V. The high-voltage battery 13 is electrically connected to the traction machine 11 to supply electrical energy to the traction machine in its motor operating mode.

FIG. 1 also shows that a first electronic control unit 14 having a first inverter 15 is connected between the traction machine 11 and the high-voltage battery 13. The control unit 14 is designed to control the traction machine 11 and, during its motor operation, to supply electrical energy to the traction machine from the high-voltage battery 13, wherein the first inverter 15 in this case takes over the function of an electrical converter between the DC voltage provided by the high-voltage battery 13 and the AC voltage required by the traction machine 11 in its motor operating mode. In particular, the traction machine 11 of the hybrid vehicle 1 is designed as a three-phase AC machine. The inverter 15 can also be referred to as a DC-AC converter.

The inverter 15 can likewise be designed to convert an AC voltage applied at the AC voltage side of the first control unit 14 to a DC voltage delivered at the DC voltage side of the control unit 14 in order to be able to charge the high-voltage battery 13 in a recuperation or generator operation of the traction machine 11 during a driving operation of the hybrid vehicle 1, for example. In this case, the first inverter 15 can also be referred to as an AC-DC converter.

FIG. 1 furthermore shows an electrical charging plug connector 16 of the hybrid vehicle 1, which is electrically connected to the high-voltage battery 13 and can be electrically connected to a vehicle-external electrical grid (not illustrated in any more detail), with the result that the high-voltage battery 13 of the plug-in hybrid vehicle 1 can be supplied with electrical energy during a charging operation from the vehicle-external grid to charge the high-voltage battery 13.

In the hybrid vehicle 1 illustrated in FIG. 1, the charging plug connector 16 is designed as a three-phase charging plug connector, which is suitable for electrical connection to a vehicle-external three-phase AC grid.

As FIG. 1 further shows, a second electric machine 17 is coupled to the exhaust-gas turbocharger 4 in torque-transmitting fashion. In the representative embodiment of the hybrid vehicle 1 shown, the second electric machine 17 is connected to the compressor 8 to mechanically drive the exhaust-gas turbocharger 4 in a motor operating mode of the second electric machine 17.

The high-voltage battery 13 is likewise electrically connected to the second electric machine 17, with the result that the high-voltage battery 13 can supply electrical energy to the second electric machine 17 in its motor operating mode. To this end, a second electronic control unit 18 having a second inverter 19 is connected between the second electric machine 17 and the high-voltage battery 13. The second electronic control unit 18 serves for controlling and supplying electrical power to the second electric machine 17. The second inverter 19 in this case takes over the function of converting the electrical DC voltage provided by the high-voltage battery 13 to an electrical AC voltage required by the second electric machine 17 in its motor operating mode. In the hybrid vehicle 1 illustrated in FIG. 1, the second electric machine 17 is designed as a three-phase AC machine, wherein each of its three electrical phases is driven separately by the second electronic control unit 18. The second inverter 19 can accordingly also be referred to in turn as a DC-AC converter.

Furthermore, the second electronic control unit 18 or the second inverter 19 is further set up to deliver an electrical AC voltage supplied to the AC voltage side of the second control unit 18 to the DC voltage side thereof as an electrical DC voltage to supple the DC voltage to the high-voltage battery 13 to charge the high-voltage battery. The second inverter 19 of the hybrid vehicle 1 thus likewise functions as an AC-DC converter.

The second electric machine 17 may be designed as a permanent-magnet synchronous machine, a three-phase asynchronous machine, or a connected reluctance machine.

As FIG. 1 further shows, the three-phase charging plug connector 16 is electrically connected to the machine-side connections of the second electronic control unit 18 that are likewise electrically connected to the second electric machine 17, wherein each electrical phase of the charging plug connector 16 is electrically connected to an electrical phase of the second electric machine 17. The three-phase AC voltage fed on the machine side into the second electronic control unit 18 via the charging plug connector 16 can thus be converted from the vehicle-external three-phase AC grid coupled to the charging plug connector 16 during the charging operation of the hybrid vehicle 1 to a DC voltage provided at the DC voltage side of the second electronic control unit 18 and suitable for charging the high-voltage battery 13.

In such a charging process of the high-voltage battery 13, the fact that a torque can be generated in the second electric machine 17 as a result of the machine-side in-feed of the three-phase alternating current via the charging plug connector 16, whereupon the exhaust-gas turbocharger 4 is driven at a grid frequency of the external AC grid of 50 Hz, for example, at a rotational speed of approximately up to 3000 revolutions per minute, can be tolerated since the air in the region of the inlet manifold 10 that is compressed in this case by the compressor 8 does not have any negative effects on the internal combustion engine 2. The design of the plug-in hybrid vehicle 1 illustrated in FIG. 1 can be realized in a space-saving and simple manner. Additional precautions that prevent rotation of the second electric machine 17 are not necessary.

As is further illustrated in FIG. 1, the plug-in hybrid vehicle 1 has an exhaust-gas recirculation device 20, which contains a controllable exhaust-gas recirculation valve 21, to selectively supply recirculation of the exhaust gas generated by the internal combustion engine 2 from the outlet side or the outlet manifold 6 of the internal combustion engine 2 to the inlet side or the inlet manifold 10 of the internal combustion engine 2 in a known manner. The exhaust-gas recirculation device 20 can advantageously be used in the hybrid vehicle 1 illustrated in FIG. 1 to prevent air accumulation from forming in front of the inlet manifold 10 of the internal combustion engine 2 during the charging process of the high-voltage battery 13 via the charging plug connector 16 at relatively high rotational speeds of the second electric machine 17 and consequently also of the exhaust-gas turbocharger 4, by virtue of the exhaust-gas recirculation valve 21 being (automatically) opened during said charging process, with the result that the charging air pressure applied at the inlet manifold 10 can escape unhindered through the exhaust-gas recirculation device 20 to the exhaust tract 7 by means of the opened exhaust-gas recirculation valve 21.

In FIG. 1, the arrangement composed of the exhaust-gas turbocharger 4, the second electric machine 17 coupled to said exhaust-gas turbocharger in order to drive the exhaust-gas turbocharger 4 and the second electronic control unit 18 controlling the second electric machine 17 is identified by a rectangle 22 illustrated using dashes. Said arrangement represents an electrical turbocharger unit 22.

Since the high-voltage battery 13 in the hybrid vehicle 1 shown in FIG. 1 is electrically connected both to the first electronic control unit 14 and to the second electronic control unit 18, a common power distributor 23 is interconnected between the high-voltage battery 13 and the respective two control units 14 and 18, said power distributor ensuring distribution of the electrical energy provided by the high-voltage battery 13 to the two control units 14 and 18 and providing a common connection of the two control units 14 and 18 to the high-voltage battery 13.

In a further advantageous embodiment of a plug-in hybrid vehicle in accordance with the invention not illustrated in FIG. 1, said hybrid vehicle has at least two turbocharger units 22, the respective second electronic control units of which can be electrically connected to one another and are electrically connected to one another during the charging operation via the vehicle-external grid to increase the charging power of the plug-in hybrid vehicle even further as a result. If required, the second electronic control units can be connected to one another in an electrical parallel circuit, for example by means of corresponding electrical switching apparatuses.

Figure 2:
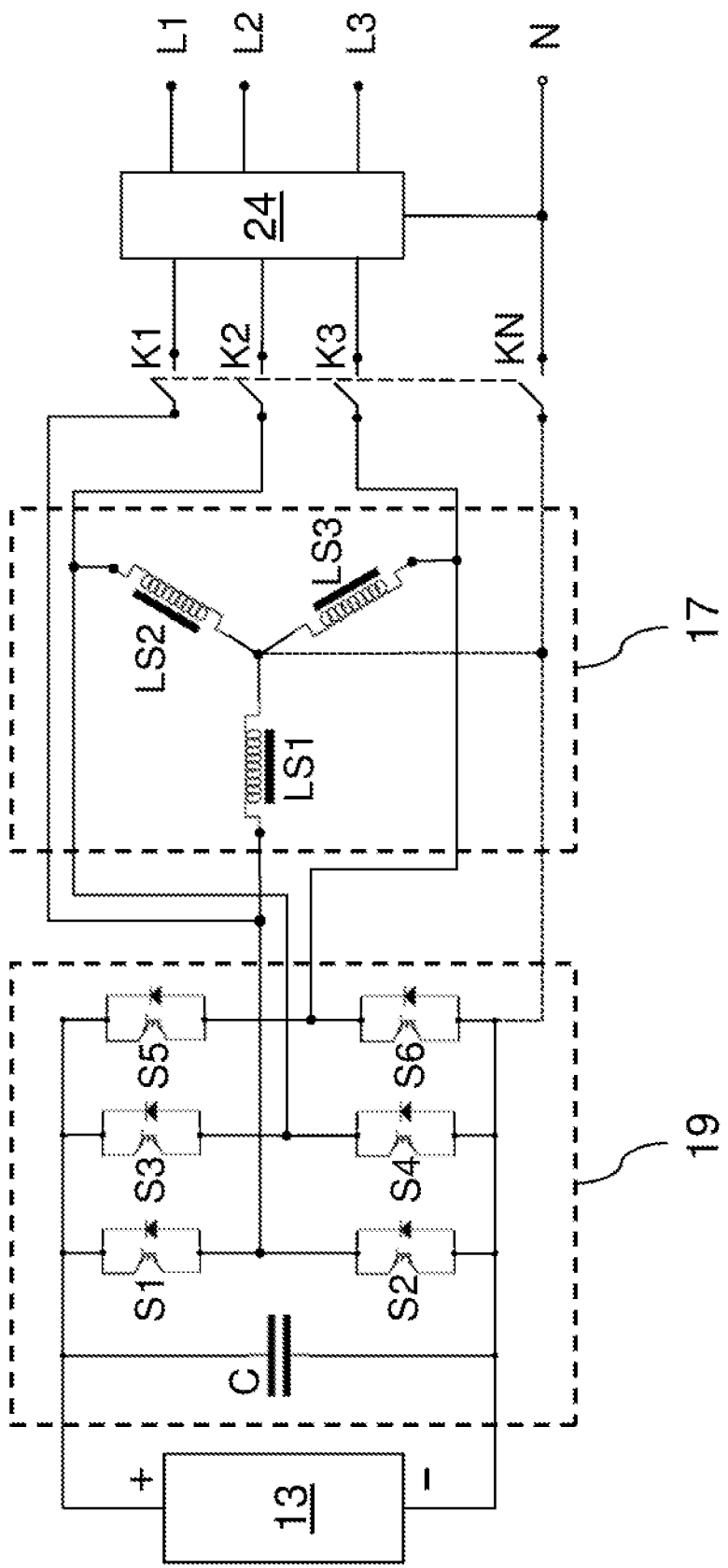
FIG. 2 schematically shows an electrical circuit diagram of an electrical turbocharger unit of the plug-in hybrid vehicle from FIG. 1.

FIG. 2 illustrates an electrical circuit diagram of the electrical turbocharger unit 22 of the plug-in hybrid vehicle 1 from FIG. 1. In this circuit diagram, the vehicle-external electrical three-phase AC grid is represented by its three phases L1, L2 and L3 and by a neutral conductor N.

If required, the three phases L1, L2 and L3 and the neutral conductor N can be connected to the AC voltage side of the second electronic control unit 18 or the second inverter 19 by means of corresponding switches K1, K2, K3 and KN and possibly by interconnecting a filter 24. The high-voltage battery 13 is connected to the DC voltage side of the control unit 18 or the second inverter 19.

During the charging operation of the high-voltage battery 13 via the vehicle-external AC grid, the switches K1, K2, K3 and KN are closed. When the hybrid vehicle 1 or the charging plug connector 16 is isolated from the vehicle-external AC grid, the switches K1, K2, K3 and KN are open.

As FIG. 2 further shows, the inverter 19 has, in a known manner, six electrical high-power switches S1-S6 interconnected in a bridge circuit, which may be embodied as high-power semiconductor components, for example transistors. A capacitor C is further connected in parallel with the switches S1-S6 at the two DC voltage connections of the high-voltage battery 13.

The second electric machine 17 may be designed as a three-phase AC machine connected to the AC voltage side of the second electronic control unit 18 or the second inverter 19. The second electric machine is represented in FIG. 2 with three inductances LS1, LS2 and LS3 in accordance with its three electrical phases.

The plug-in hybrid vehicle according to one or more representative embodiments has been explained in detail with reference to the representative embodiment illustrated in the figures. However, the hybrid vehicle is not restricted to the embodiments described herein, but rather also encompasses other embodiments that have a similar effect.

While exemplary embodiments are described above, it is not intended that these embodiments describe all possible forms of the claimed subject matter. The words used in the specification are words of description rather than limitation, and it is understood that various changes may be made without departing from the spirit and scope of the disclosure and claims. Additionally, the features of various implementing embodiments may be combined to form further embodiments within the scope of the claimed subject matter that may not be explicitly described or illustrated.

What is claimed is:

1. A vehicle comprising:
   an engine having a turbocharger;
   a first electric machine coupled to at least one wheel;
   a second electric machine coupled to the turbocharger;
   a battery coupled to the first and second electric machines; and
   a controller coupled to the second electric machine and a plug configured to connect to an external electric grid, wherein the second electric machine drives the turbocharger during charging of the battery from the external electric grid.

2. The vehicle of claim 1 wherein the plug is connected to machine-side connections of the controller that are electrically connected to the second electric machine.

3. The vehicle of claim 1 wherein the controller comprises an inverter configured to convert DC electrical energy provided by the battery to AC electrical energy required by the second electric machine when operating as a motor.

4. The vehicle of claim 1 wherein the controller comprises an inverter configured to convert AC electric energy supplied from the external electric grid via the plug to DC electrical energy required by the battery.

5. The vehicle of claim 1 wherein the battery comprises a high-voltage battery with a rated voltage of at least 320 V.

6. The vehicle of claim 1 wherein the second electric machine comprises a three-phase AC machine with each phase actuated separately by the controller.

7. The vehicle of claim 1 wherein the second electric machine comprises a permanent magnet synchronous machine, a three-phase asynchronous machine, or a connected reluctance machine.

8. The vehicle of claim 1 wherein the plug is configured to connect to an external three-phase AC electrical grid.

9. The vehicle of claim 1 further comprising an exhaust gas recirculation (EGR) system selectively supplying exhaust from the engine to an intake of the engine via an EGR valve, the EGR valve controlled to open during charging of the battery from the external electric grid.

10. A vehicle comprising:
    an engine having a turbocharger;
    a traction battery;
    a first electric machine coupled to the traction battery and at least one vehicle wheel; and
    a second electric machine mechanically coupled to a compressor of the turbocharger and electrically coupled to a plug configured to charge the traction battery, wherein the second electric machine drives the compressor during traction battery charging from an external electric grid.

11. The vehicle of claim 10 further comprising an exhaust gas recirculation (EGR) system including an EGR valve, wherein the EGR valve is controlled to open during traction battery charging from the external electric grid.

12. The vehicle of claim 10 wherein the engine is mechanically coupled to at least one vehicle wheel.

13. The vehicle of claim 10 wherein the second electric machine comprises a three phase electric machine.

14. The vehicle of claim 10 further comprising:
    a first controller coupled to the first electric machine and having a first inverter; and
    a second controller coupled to the second electric machine and having a second inverter.

15. A method for controlling a vehicle having an engine with a turbocharger, a first electric machine coupled to vehicle wheels, a second electric machine mechanically coupled to the turbocharger and a plug configured to connect to an external electric grid, and a battery connected to the first and second electric machines, the method comprising:
    operating the second electric machine as a motor to drive the turbocharger responsive to charging of the battery from the grid.

16. The method of claim 15 wherein the vehicle includes an exhaust gas recirculation valve, the method further comprising controlling the exhaust gas recirculation valve to open during charging of the battery from the grid.

17. The method of claim 15 wherein the second electric machine comprises a three phase electric machine.

* * * * *